United States Patent Office 3,296,206
Patented Jan. 3, 1967

3,296,206
COPOLYMERS OF ACETALS
Claus Schott, Hofheim am Taunus, and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 22, 1963, Ser. No. 274,824
Claims priority, application Germany, Apr. 28, 1962, F 36,669
1 Claim. (Cl. 260—67)

The present invention relates to a process for the manufacture of copolymers of acetals.

It is known that polyoxymethylenes of high molecular weight can be obtained by anionic polymerization of formaldehyde or cationic polymerization of trioxane, the cyclic trimer of formaldehyde. Homopolymeric polyoxymethylene constitutes a polyacetal with unstable terminal hemiformal groups. It is thermally decomposed, except for a small proportion, by the so-called unzipping reaction. In this reaction, a new unstable terminal hemiformal group is formed at the molecule on the degradation of a hemiformal molecule.

To convert such polyoxymethylenes with terminal hemiformal groups into technically useful plastics is is necessary to esterify the terminal groups. For this purpose, the polymer must be dissolved at 160° C., for example, in acetic anhydride. After the esterification, the excess of acetic anhydride and the acetic acid formed must be removed from the polymer by complicated purifying processes.

Moreover, the polymers thus stabilized are unstable towards alkalies owing to the danger of saponification. Furthermore, when a molecule chain which has been stabilized by esterification of the terminal groups is thermally ruptured in the interior part of the chain, an unzipping reaction sets in. This applies also to products with esterified terminal groups.

More favourable results in the stabilization of polyoxymethylenes are obtained by copolymerizing trioxane, for example, with saturated cyclic ethers or cyclic formals such as, for example, ethylene oxide or diethylene glycol formal.

To stabilize the polymers the unstable terminal groups are decomposed by hydrolysis after the polymerization, the unzipping reaction stopping at the comonomer molecules. When, in this case, the polymer chain is thermally ruptured the decomposition stops at the next comonomer molecule so that an improbed thermostability is obtained.

As catalysts for the manufacture of the above mentioned copolymers, boron fluoride or its derivatives, for example etherates, or diazonium fluoroborates are used.

Copolymers of acetals, particularly copolymers having a high content of polyoxymethylene units of high molecular weight and high stability, are successfully used for the manufacture of injection molded or extruded articles of plastics material, which articles may, for example, also be used at elevated temperatures.

In special cases it is desired to obtain products that are particularly stable towards oxidation.

Now we have found that copolymers having a high stability towards oxidation and a high thermal stability can be obtained by copolymerizing trioxane with the cyclic formal of a saturated thioether which may be substituted by an aliphatic hydrocarbon radical having 1 to 4 carbon atoms or a mono- or binuclear aromatic radical, for example thiodiglycolformal. The cyclic formal of a thioether containing terminal OH groups is used in an amount of 1 to 20% by weight, advantageously 1 to 10% by weight, calculated on the total weight of the monomer mixture.

By this copolymerization, —C—C— groups and also sulfur are incorporated with the main chain of the polymer. In this maner, a thermal stability as well as a stability towards oxidation are obtained by copolymerization with only one comonomer, which was not possible with the comonomers hitherto used.

As catalysts for the polymerization of the invention there are used cationic catalysts such as Lewis acids (for the definition of Lewis acids cf. "Lehrbuch der Elektrochemie" by Kortum, Weisbaden 1948, pages 300/301), their complex compounds, etherates or oxonium salts. Boron fluoride or its derivatives such as etherates and diazonium fluoroborates are especially suitable. The catalyst is generally used in an amount within the range of 0.001 to 1.0% by weight, advantageously 0.003 to 0.1% by weight, calculated on the total weight of the monomer mixture. In principle, known cationic catalysts, for example those described in U.S. patent application Ser. No. 860,739, filed December 21, 1959, may be used.

The polymerization may be carried out in bulk, or in solution or suspension. In the polymerization in bulk, which takes a particularly favorable course, the comonomer and the catalyst are introduced into liquid, freshly distilled trioxane. The reaction time is within the range of 5 minutes to 24 hours.

The polymerization is advantageously carried out at temperatures at which trioxane does not crystallize out, that is depending on the solvent used at a temperature within the range of —50 to +100° C. and in the absence of solvent at a temperature within the range of +20 to +100° C., advantageously +60 to +80° C.

The polymerization product is advantageously worked up as follows:

After the product has been comminuted, the catalyst is deactivated by treating the product with an amine, for example triethanol amine, in an organic wash liquid that dissolves unreacted trioxane, advantageously an aliphatic alcohol with 1 to 4 carbon atoms, for example methanol.

The products obtained by the process of the invention can be used for making, for example, shaped articles.

More advantageously, those of the porducts obtained by the process of the invention are used which have been subjected to a homogeneous or heterogeneous hydrolysis to decompose unstable terminal hemiformal groups.

The products which have thus been stabilized and may be still further stabilized in known manner by adding phenols, aromatic amines or amidines, may be used with great advantage for the manufacture of injection molded articles, sheets, films and fibers.

The following examples serve to illustrate the invention but they are not intended to limit it thereto, the parts being by weight unless otherwise stated.

*Example 1*

95 grams liquid, freshly distilled trioxane and 5 grams thiodiglycol formal were placed in a screw-top glass bottle and thoroughly mixed. Then 0.08 cc. etherate of boron fluoride was added from an injection syringe. The glass bottle was closed and introduced into a water bath at 70°

C. After about 5 hours, the beginning of the polymerization became evident by the development of turbidity.

When the reaction was terminated, the glass bottle was broken and the product was comminuted and boiled with methanol and triethanol amine.

By subjecting the product at 150° C. for 1 hour to a homogeneous hydrolysis in benzyl alcohol in the presence of 1% of amine and then extracting the benzyl alcohol with methanol, a white powder was obtained. The yield amounted to 47%. To test the thermostability of the hydrolyzed polymer, the latter was kept in an aluminum block for 45 minutes at 230° C. in air in the absence of a stabilizer.

The loss of weight of the polymer was 0.41% per minute, whereas the loss of weight of a corresponding copolymer containing diethylene glycol formal as the comonomer was 0.58% per minute, in the same test.

*Example 2*

100 parts trioxane and 10 parts thio-diethylene-glycol-formal were copolymerized in the presence of 0.1 part etherate of boron fluoride in a reaction vessel of refined steel which ensured a particularly good heat dissipation. The product was worked up as described in Example 1. The yield amounted to 62%. The sulfur content of the copolymer was determined by analysis and from the values so obtained it could be calaculated that the copolymer contained 12% of thiodiglycolformal incorporated by the polymerization.

We claim:

A solid, thermally stable and oxidation resistant copolymer consisting of 99 to 80 percent by weight of oxymethylene units and 1 to 20 percent by weight of units derived from thiodiglycolformal.

References Cited by the Examiner

UNITED STATES PATENTS

| | | | |
|---|---|---|---|
| 2,457,224 | 12/1948 | Gresham | 260—67 |
| 3,027,352 | 3/1962 | Walling et al. | 260—67 |
| 3,194,788 | 7/1965 | Kullmar et al. | 260—67 |
| 3,197,420 | 7/1965 | Weissermil et al. | 260—67 |
| 3,218,300 | 11/1965 | Kullmar et al. | 260—79 |

FOREIGN PATENTS

| | | |
|---|---|---|
| 1,346,542 | 12/1963 | France. |
| 1,365,087 | 5/1964 | France. |

OTHER REFERENCES

Derwent Belgian Patents Report, 72A, (Feb. 10, 1961), p. C8, For. Pat. Jour.

Schonfeld, Journal of Polymer Science, vol. 49, No. 152, (February 1961), pp. 277–282.

WILLIAM H. SHORT, *Primary Examiner.*

L. M. MILLER, *Assistant Examiner.*